United States Patent [19]

Jordan et al.

[11] Patent Number: 4,862,053
[45] Date of Patent: Aug. 29, 1989

[54] MOTOR STARTING CIRCUIT

[75] Inventors: Howard E. Jordan, Euclid, Ohio; Edward J. Woods, Southworth, Wash.; John T. Caruso, Bound Brook, N.J.; Luciano Forte, Spring Valley, N.Y.

[73] Assignee: Reliance Electric Company, Cleveland, Ohio

[21] Appl. No.: 82,748

[22] Filed: Aug. 7, 1987
(Under 37 CFR 1.47)

[51] Int. Cl.$^4$ ............................................. H02P 1/44
[52] U.S. Cl. ..................................... 318/786; 318/785
[58] Field of Search ...................... 318/785, 786, 778

[56] References Cited

U.S. PATENT DOCUMENTS

| | | |
|---|---|---|
| 3,671,830 | 6/1972 | Kruper . |
| 3,777,232 | 12/1973 | Woods et al. . |
| 3,792,324 | 2/1974 | Suarez et al. . |
| 3,882,364 | 5/1975 | Wright et al. . |
| 4,443,749 | 4/1984 | Douthart et al. . |
| 4,467,257 | 8/1984 | Douthart et al. . |
| 4,622,506 | 11/1986 | Shemanske et al. . |

*Primary Examiner*—David Smith, Jr.
*Attorney, Agent, or Firm*—Pearne, Gordon, McCoy & Granger

[57] ABSTRACT

An electronic starting circuit for a single-phase electric motor is disclosed in which the motor has a first, and possibly a second, main winding and has an auxiliary winding used for starting. The voltage across the auxiliary winding increases as the motor speed accelerates and is used as a sensing signal. This signal is applied through an amplifier to a peak detector which determines the peak DC output and compares it with a reference voltage. When the reference voltage is the larger, than an auxiliary switch connected in series with the motor auxiliary winding is closed for starting of the motor. When the peak DC output voltage from the peak detector exceeds the reference voltage, the auxiliary switch is opened. Instant reversing of the motor is possible by discharging a capacitor in the peak detector at the time of reversal so as to re-energize the auxiliary winding. The circuit also operates on a two-speed motor. The motor starts on the high-speed main winding, and then transfers to the low-speed main winding if low speed is selected. The foregoing abstract is merely a resume of one general application, is not a complete discussion of all principles of operation or applications, and is not to be construed as a limitation on the scope of the claimed subject matter.

24 Claims, 5 Drawing Sheets

MOTOR STARTING CIRCUIT

BACKGROUND OF THE INVENTION

This invention relates to an electronic switch used to disconnect the auxiliary winding of a single-phase electric motor after the motor has started and reached approximately normal running speed. The electronic switch described herein is applicable to single speed, two-speed, and instantly reversible motors, which are the three application conditions commonly required.

Single-phase electric motors inherently have zero torque at standstill. This is because there is primarily a vibrating magnetic field applied to the rotor rather than any rotational torque. A commonly used method for starting single-phase motors is to incorporate an auxiliary winding which is spaced up to 90° electrical degrees away from the main winding and excited with current which leads or lags the exciting current for the main winding. This combination provides a rotating magnetic field in the motor air gap and starting torque results. A commonly used technique for achieving a leading current in the auxiliary winding is to place a capacitor in series with such winding. Since this auxiliary circuit is used only during starting, neither the capacitor not the auxiliary winding is rated for continuous duty, and they are therefore switched out of the circuit as soon as the motor is near its normal running speed. Mechanical centrifugal switches and current-operated relays are two of the motor common techniques used for accomplishing this switching action, with the centrifugal switch being by far the most widely used.

The mechanical switch has a number of disadvantages, including difficulty in adjusting the alignment of the stationary and rotating parts, with improper alignment causing the switch to malfunction.

Another disadvantage is a limited life because of arcing, which causes corrosion and pitting of the electrical contacts. When such mechanical switches are attempted to be used to obtain two-speed operations and instantaneous reversing, such switches become mechanically complex and relatively unreliable. These mechanical shortcomings have been endured for many years because of the low cost of the mechanical centrifugal switches.

An electronic replacement for centrifugal switches has been a long-sought goal which is now realizable in view of the cost reductions being realized as a result of increased circuit integration. Most of the prior art attempts at electronic switching have required a speed feedback signal to the electronic circuit as the means for providing information to the circuit as to when it should trigger the auxiliary switch to the off condition. This added device plus the cost of the electronics have combined to keep the electronic switch from becoming price-competitive with mechanical centrifugal switches. One technique has been to use time as the base for switching, but this technique is satisfactory only for a specific motor and load inertia, and consequently cannot be used for general purpose applications.

U.S. Pat. No. 3,792,324 utilized the voltage across a part of the auxiliary winding and the starting capacitor, or the voltage across the starting capacitor to control the opening of an axuiliary switch. When this switch opened, it terminated current flow through the starting capacitor but the current continued to flow through the starting winding and a running capacitor.

U.S. Pat. No. 3,671,830 rectified a voltage obtained from the auxiliary winding and then used this in a feedback circuit which was variable by means of a rheostat to control a Schmidt trigger circuit controlling the auxiliary switch.

U.S. Pat. No. 3,777,232 utilized a switching signal obtained from the relative phase between the main winding current and the start winding current, or the relative phase between the main winding current and the applied voltage. All of these circuits had limitations effectively limiting the application of such circuits to single-speed motors rather than to the capability of the present circuit, which included dual-speed motor starting circuits and instantaneous reversing circuits.

U.S. Pat. No. 4,443,749 disclosed two and four-pole main windings and an auxiliary winding, with the motor starting on high speed and then changing to low speed if the low speed was selected. This patent utilized a centrifugal switch to de-energize the auxiliary winding. U.S. Pat. No. 4,467,257 has a somewhat similar arrangement.

U.S. Pat. No. 4,622,506 utilized a comparator of the peak detected voltages of the main and auxiliary windings.

SUMMARY OF THE INVENTION

The invention described herein uses the voltage appearing across the auxiliary winding or, in some cases for two-speed motors, a separate sense winding, to determine the proper speed condition for switching. This eliminates the need for separate devices and enables a single switching circuit to accommodate the three widely used application conditions of single-speed, dual-speed, and instantaneous reversing.

As will be seen from the various prior art patents, many different means have been utilized to obtain a switching signal at which the auxiliary or starting winding is de-energized. This switching signal in the prior art has been obtained from current, voltage, relative phase between currents, relative phase between current and voltage, an R-C time delay, and a tachometer feedback. In many of these circuit arrangements, the signal is terminated once the auxiliary winding has been deenergized. A feature of the present invention is that the signal remains even though the auxiliary winding has been de-energized and current therethrough ceased, and therefore the present invention is applicable for the three application conditions of single-speed, dual-speed, and instant reversing.

The problem to be solved, therefore, is how to construct an electronic starting circuit which will meet the three application conditions of a single-speed motor, a dual-speed motor, and an instantly reversible motor.

This problem is solved by an electronic starting circuit for a single-phase electric motor, the motor having at least a first main winding and at least one auxiliary winding for starting, said electronic starting circuit comprising, in combination, means to obtain a signal increasing as the motor speed accelerates to a switching speed near normal running speed, an amplifier having an input from said signal obtaining means, peak detector means connected responsive to the output of said amplifier to determine a peak DC output, a reference voltage, comparison means to compare the output of said peak detector means with said reference voltage, an auxiliary switch connected in series with said motor auxiliary winding and adapted to be energized from AC voltage conductors, and a switching circuit connected to said voltage comparison means and connected to close said auxiliary switch when said peak detected voltage is less than said reference voltage and to open said auxiliary switch and terminate current through said auxiliary winding when said peak detected voltage is greater than said reference voltage.

The problem is further solved by an electronic starting circuit for a single-phase electric motor having high and low speed main winding arrangements and at least one auxiliary winding for starting from AC voltage conductors, said electronic starting circuit comprising, in combination, means to obtain a signal increasing as the motor speed accelerates to a switching speed near normal running speed, a reference, comparator means to compare said signal with said reference, an auxiliary switch connected in series with said motor auxiliary winding and the series combination adapted to be connected to AC voltage conductors, a switch circuit connected to said comparator means and connected to close said auxiliary switch when said signal is less than said reference and to open said auxiliary switch when said signal is greater than said reference, a high speed switch connected in series with said high speed main winding arrangement and a low speed switch connected in series with said low speed main winding arrangement, starting means to close said auxiliary winding switch and one of said main winding switches for starting the motor and accelerating it to said switching speed, and said switching circuit opening said auxiliary winding switch at said switching speed.

The problem is further solved by an electronic starting circuit for a single-phase electric motor, the motor having at least a first main winding and at least one auxiliary winding for starting from AC voltage conductors, said electronic starting circuit comprising, in combination, means to obtain a signal increasing as the motor speed accelerates to a switching speed near normal running speed, peak detector means connected to be responsive to said switching speed signal and having an output voltage a reference voltage, comparison means to compare the output voltage of said peak detector means with said reference voltage and to establish a switching voltage output only when the peak detector output voltage exceeds said reference voltage, an auxiliary switch connected in series with said motor auxiliary winding and the series combination adapted to be energized from AC voltage conductors, a switching circuit connected to said voltage comparison means and connected to close said auxiliary switch upon the absence of said switching voltage and to open said auxiliary switch upon receiving said switching voltage, reversing means to reverse the connections of one of said auxiliary or main windings to the AC voltage conductors, and means to rapidly decrease the output of said peak detector means upon actuation of said reversing means to thus close said auxiliary switch and re-energize said auxiliary winding.

Accordingly, an object of the invention is to provide an electronic starting circuit for single-phase electric motors which has wide applications.

Another object of the invention is to provide an electronic starting circuit for single-phase motors wherein the same circuit may be utilized for single-speed motors, dual-speed motors, and instantly reversible motors.

DESCRIPTION OF THE PREFERRED EMBODIMENTS

Figure 1:
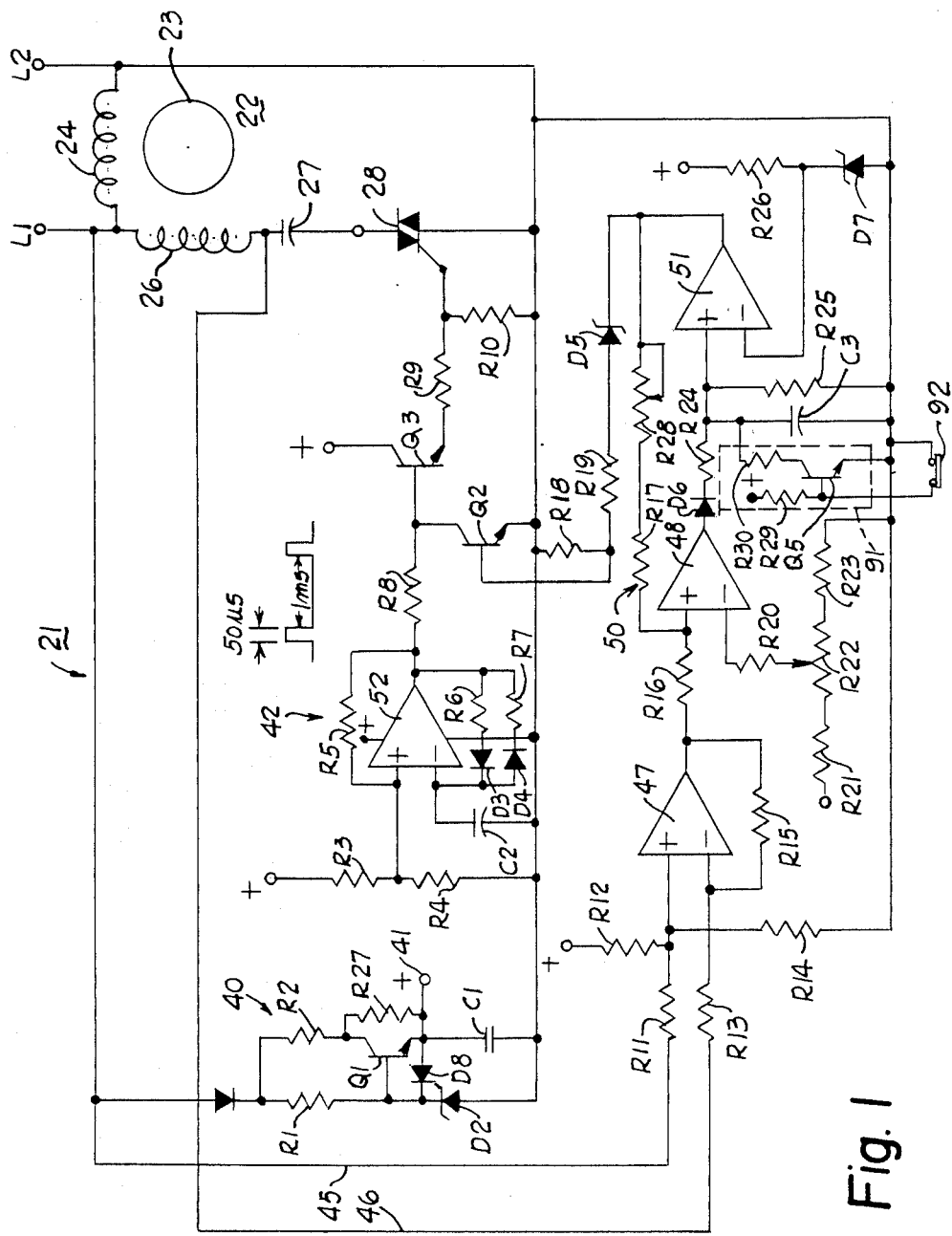
FIG. 1 is a schematic diagram of a simplified circuit embodying the invention.

FIG. 1 is a schematic diagram of a first embodiment of the invention of an electronic starting circuit 21 for a single-phase electric motor 22 having a rotor 23, a first main winding 24, and an auxiliary winding 26 for starting. The windings 24 and 26 are energizable from single-phase AC line conductors L1 and L1, with the auxiliary winding 26 being energizable through a capacitor 27 and an auxiliary switch 28. The motor 22 may be an inductor motor, and in this embodiment is shown as an induction motor. The auxiliary winding may be one of many forms which has a current therethrough of different phase from the current through the main winding, such as a resistance split-phase motor, and in this embodiment is shown as a capacitor-start motor.

Figure 2:
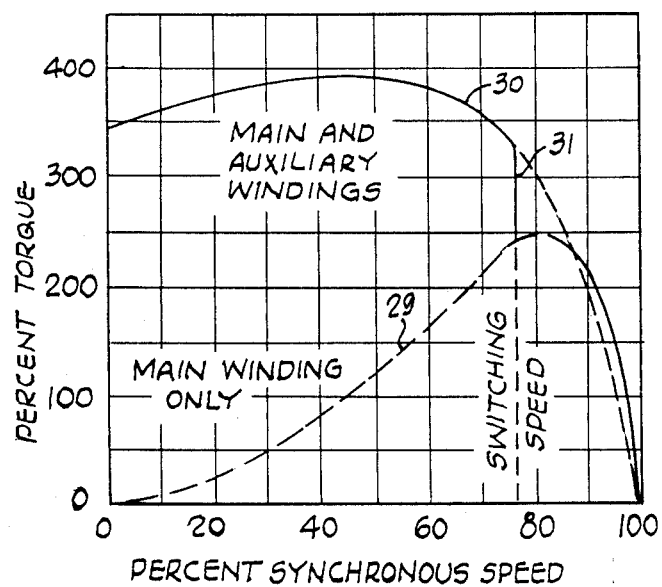
FIG. 2 is a curve of torque versus speed for the main and auxiliary windings of the motor.

FIG. 2 illustrates a speed-versus-torque curve 29 of the motor, with the main winding 24 only being energized, and shows zero torque at zero speed. With main and auxiliary windings 24 and 26 energized, a curve 30 illustrates that in excess of 300% torque may be achieved at starting from zero speed. A line 31 intersecting both curves indicates the switching speed at about 75–80% of synchronous speed, and with the induction motor illustrated, the running speed is about 95% of the synchronous speed for motors of the ¾ horsepower to 2 horsepower range.

Figure 3:
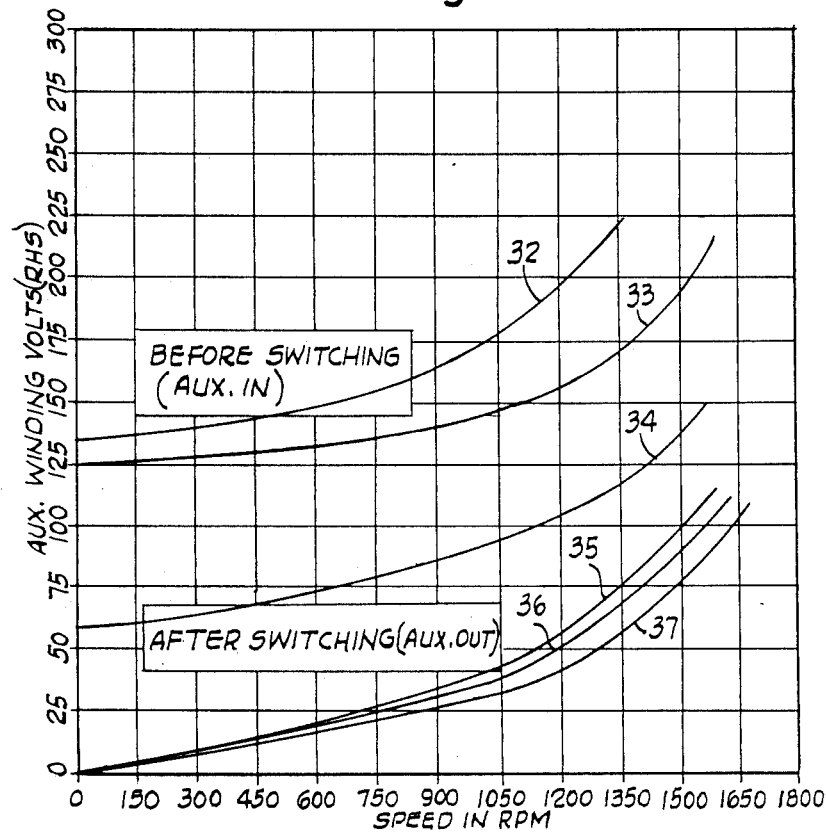
FIG. 3 is a graph of a family of curves showing the voltage across the auxiliary winding.

FIG. 3 illustrates a family of curves 32, 33, and 34 of the voltage across the auxiliary winding 26 before this winding is switched out of the circuit. Curve 32 may be for a motor with a large turns ratio between the auxiliary and main winding and with a high line voltage applied to the motor, curve 34 may be for a smaller turns ratio design with a low line voltage applied thereto, and curve 33, for a typical motor and normal line voltage. FIG. 3 also shows a family of curves 35, 36, and 37 for similar motor designs and line voltage conditions of the voltage across the auxiliary winding 26 after the auxiliary switch 28 has been opened. This voltage is induced into the auxiliary winding by the rotating magnetic field set up by the main winding 24. This is with the usual distributed windings in the motor stator. These curves 35-37 show that the voltage available is considerably lower, yet the existence of this lower voltage is important to the operation of the starting circuit 21.

Reverting to FIG. 1, a power supply 40 is connected across the lines L1 and L2, and develops a DC operating voltage, e.g., ±15 volts, at the termial 41. A pulse oscillator circuit 42 generates high amplitude pulses with the width narrow relative to the time spacing therebetween, and these are used for driving the auxiliary switch 28 into conduction. This auxiliary switch 28 is preferably a semiconductor switch, such as a triac, having a gate terminal to which the pulses are supplied. In one embodiment of this invention, these pulses were one millisecond apart, and had a duration of about 50 microseconds. Thus, the gate of the triac was pulsed 1000 times per second, but the driving power was off 95% of the time in order to save power.

Conductors 45 and 46 are connected across the auxiliary winding 26 as a condition sensing means to sense an electrical condition of the motor 22. This senses a condition which increases as the motor speed accelerates to a switching speed normal running speed. This might be current sensing, phase, tachometer feedback, or an R-C time delay, but is shown as the voltage across the auxiliary winding 26 which obtains a signal which increases as the motor speed accelerates. The signal from these conductors is applied through resistors R11 and R13 to op amp 47 and from the output thereof to op amp 48. Amplifier 47 is connected as a differential amplifier and the output thereof is passed to a peak detector circuit 50, which includes diode D6 and capacitor C3. The output of op amp 48 is rectified by diode D6 and the output passed to the capacitor C3. Hence, the capacitor C3 is charged to the peak of the half-wave rectified voltage, and this is also a voltage which increases as the motor speed accelerates. D5 and D7 are Zener diodes, which in this embodiment are 3.9 and 10 volts, respectively. An amplifier 51 is connected as a comparator to compare the peak detected DC output voltage with that of the Zener diode D7 as a reference, and when exceeded, amplifier 51 will have a positive output which is fed back by a positive feedback circuit including R17 and R28. Tihs immediately increases the output of amp 51 and when it exceeds the Zener voltage of D5, the Zener conducts in the reverse direction and passes a signal through R19 to semiconductor Q2 to turn on this semiconductor. This turns off semiconductor Q3, which had previously been supplying a biasing or switching signal to the gate of 28 to turn it on.

It will be noted that when the lines L1 and L2 are first energized, the main winding 24 is, of course, energized and the auxiliary winding 26 is also energized. This is because semiconductor Q2 is normally off, so that the base of Q3 is high to turn on this semiconductor supplying energy to the gate of the auxiliary switch 28. As previously stated, the pulse oscillator 42 supplies pulses at one millisecond intervals so Q3 is normally on for 50 millisecond pulses. This is sufficient to turn on this triac 28 essentially at the start of each half-cycle for substantially full energization of the auxiliary winding 26. The differential amplifier 47 is a scaling amplifier which scales the signal from the auxiliary winding 26 to an appropriate value for the voltages in the transistorized electronic circuit 21 and, by way of example, the switching voltage of 3.9 volts is chosen to be at about the switching speed 31 shown in FIG. 2. The semiconductors Q2 and Q3 may be considered to be a switching circuit which is connected to the voltage comparison means 51 to close the auxiliary switch 28 when the peak detected voltage is less than the reference voltage and to open the auxiliary switch 28 when the peak detected voltage is greater than the reference voltage. This opening of the auxiliary switch 28 terminates any current flow through the auxiliary winding 26. However, as shown in FIG. 3, curves 35-37, a voltage is still induced in the auxiliary winding 26 even though it is switched out of the circuit. This voltage will be in the range of 90-20 volts as an example. In FIG. 1, it is noted that the amplifier 51 has a feedback to the non-inverting input of amplifier 48. The positive feedback through R17 and R28 immediately increases the output of the comparator 51, and hence provides hysteresis so that the reference voltage of D5 is still exceeded, to keep the auxiliary switch 28 open.

Figure 4:
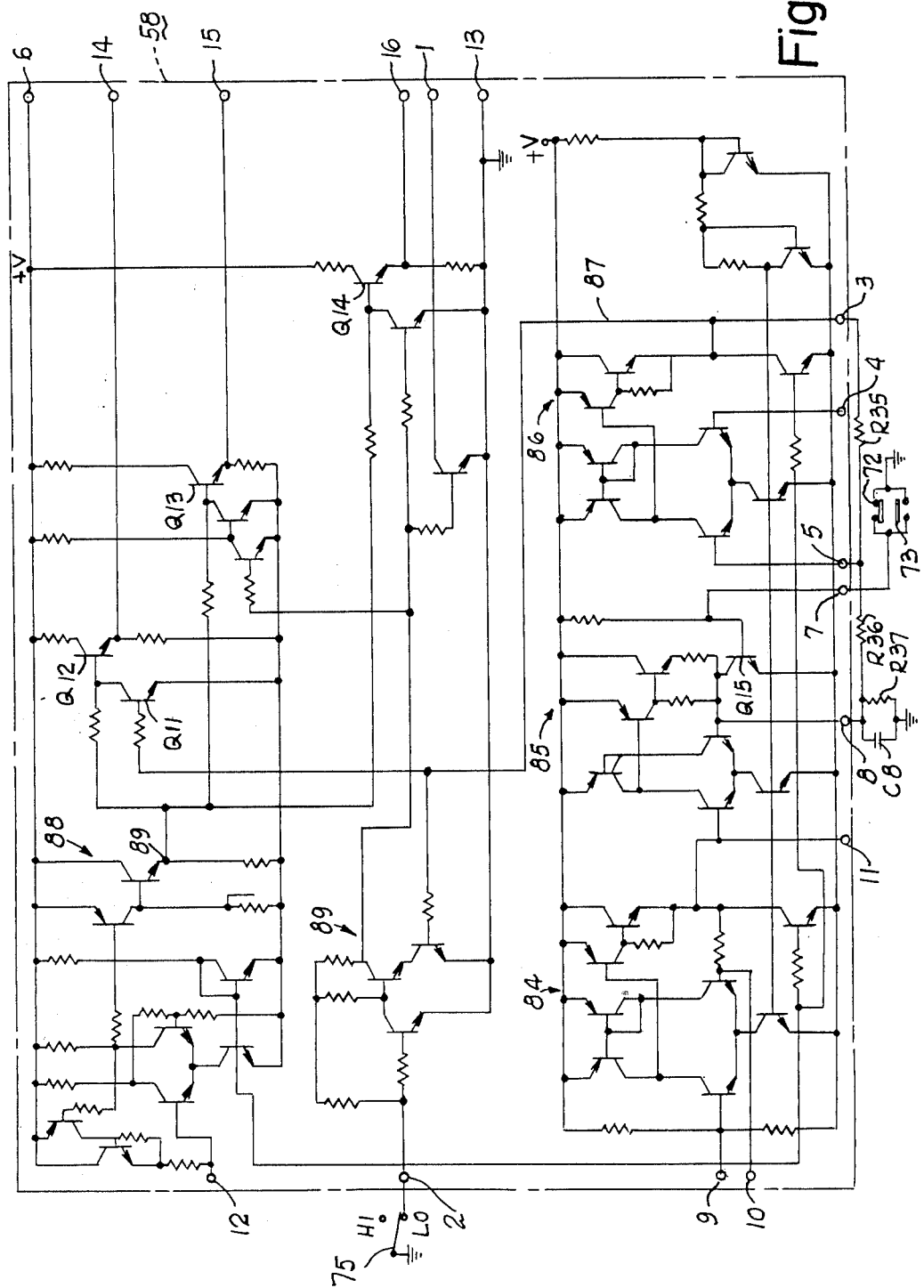
FIG. 4 is a schematic circuit diagram mostly of an integrated circuit of another embodiment of the invention.
Figure 5:
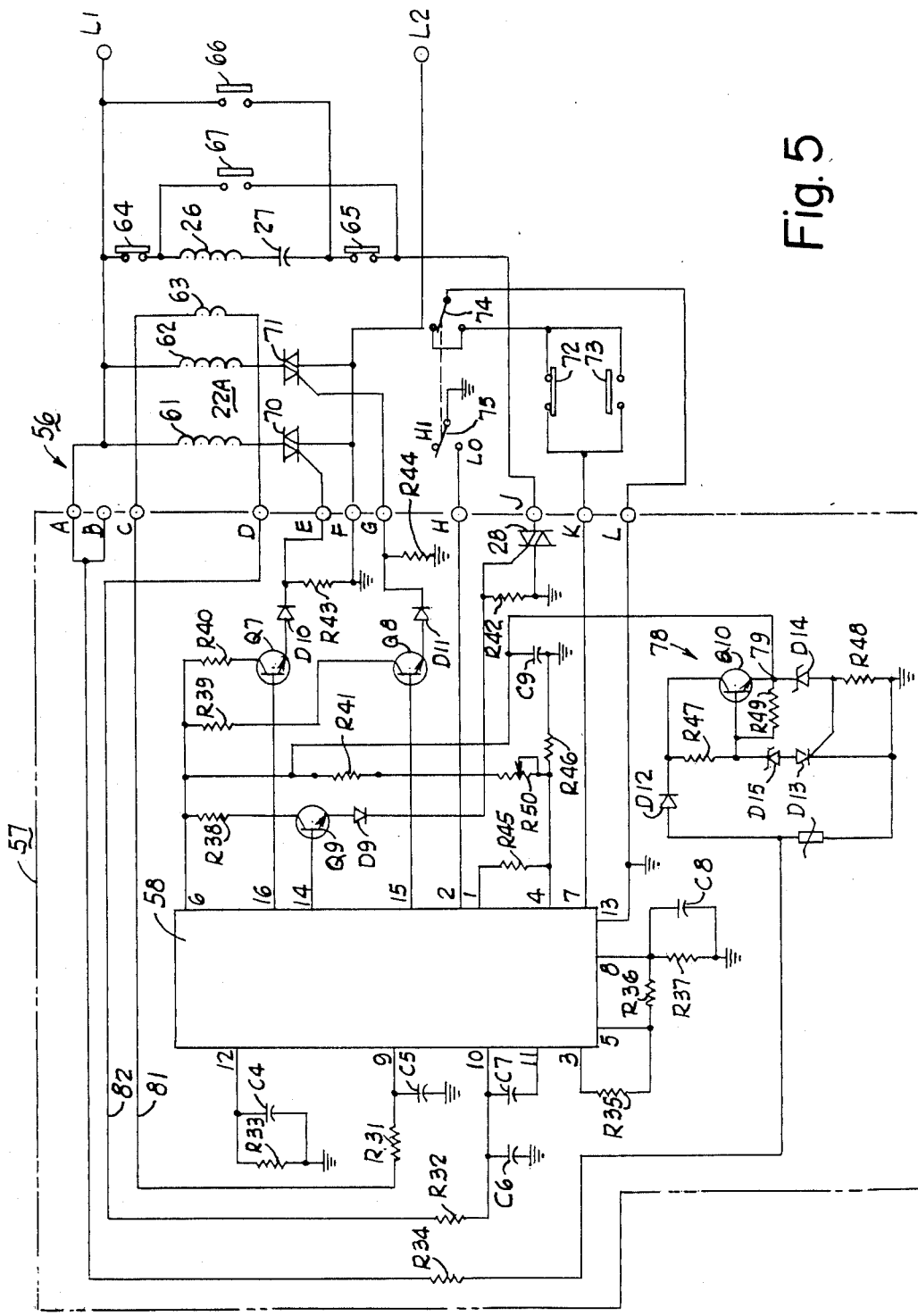
FIG. 5 is a schematic diagram of the electronic starting circuit of the invention for dual-speed and reversing.

FIGS. 4 and 5 illustrate a preferred embodiment of the invention wherein FIG. 5 shows that the electronic starting circuit 56 includes a circuit 57 of the type usually manufactured on a printed circuit board, and on that printed circuit board an integrated circuit 58 with 16 terminals 1-16 is provided. FIG. 4 shows the internal circuitry of the integrated circuit 58 with the 16 terminals 1-16, and also shows some of the external circuitry on the printed circuit 57 in order to complete the electrical paths through the circuit.

Referring first to FIG. 5, the electronic starting circuit 56 is shown with a two-speed motor having a low-speed main winding 61 and a high-speed main winding 62, as well as the auxiliary winding 26. Also, a sense winding 63 is provided with a few turns in the slots with the auxiliary winding 26. A voltage will be induced in this sense winding proportional to the voltage in the auxiliary winding 26. The auxiliary winding 26 has forward switches 64 and 65 which are connected in series with the combination of the auxiliary winding 26 and starting capacitor 27, with forward switch 64 connected to the line L1. Reverse switches 66 and 67 are also connected in series with this series combination of the auxiliary winding and starting capacitor, but with current flow switched in phase by 180 electrical degrees through the auxiliary winding 26. Thus, the reverse switches 66 and 67 are reversing means to reverse the connections of one of the main or auxiliary windings to the AC voltage conductors. This will provide reverse rotation to the motor 22. The switches 64-67 may be manual switches, or may be semiconductor switches such as triacs, but are shown as relay contacts, with the relay coils not shown, but which may be the usual prior art arrangement for reversing the motor direction.

The circuit 57 has 11 terminals A through L, respectively, with line L1 connected to terminals A and B, and line L2 connected to terminal F, which is the internal ground for the circuit 57. The auxiliary winding 26 is connected to the starting capacitor 27 and forward switch 65 to terminal J, and internally of the circuit 57 the auxiliary switch 28, shown as a triac, is connected between this terminal J and ground. This shows the correspondence between the circuits of FIGS. 1 and 5. The low-speed main winding 61 is connected through a low-speed switch 70 to line L2, and the high-speed winding 62 is connected through a high-speed switch 71 to the line L2, A normally closed forward switch 72 is paralleled with a normally open reverse switch 73 and these switches 72 and 73 are actuated in direct accordance with the actuation of the forward and reverse switches 64-67. This parallel combination is connected to the circuit 57 terminal K on one end, and on the other end is connected to both terminals of a single-pole, double-throw, HI/LO switch 74. The common terminal of this switch is connected to the circuit 57 terminal L. The HI/LO switch 74 has two gangs, and the second gang 75 is also a single-pole, double-throw switch, with the common terminal grounded, one terminal H1 terminal being open and the low terminal being connected to the circuit 57 terminal H.

Within the circuit 57, semiconductor Q7 is a low speed switch and provides gate drive for the low speed main winding switch 70 and semiconductor Q8 is a high speed switch and provides gate drive for the high speed switch 71. Semiconductor Q9 provides gate drive for the auxiliary switch 28. A power supply 78 supplies operating voltage for the circuit 57 at a power supply terminal 79, and this might be 5 volts DC, as an example.

FIG. 4 shows the internal circuitry of the integrated circuit 58, plus a few of the external components on the circuit 57 for completion of electrical paths through this integrated circuit. Conductors 81 and 82 on the circuit 57 come from the sense winding 63, and supply a signal through resistors R31 and R32 to terminals 9 and 10 of the integrated circuit.

FIG. 4 shows the internal circuitry of the integrated circuit 58. At the lower left of FIG. 4, the group of transistors form a differential amplifier 84 so that when terminal 9 is positive, there is an output appearing at terminal 11. When terminal 10 is positive, no output appears at terminal 11, and hence this is a differential amplifier 84 as well as a half-wave rectifier. The signal at terminals 9 and 10 is an AC signal which increases as the motor speed increases, and the signal at terminal 11 is one which is a unidirectional voltage, increasing as the motor speed increases. The differential amplifier 84 is similar in function to the amplifier 47 of FIG. 1. When a signal appears at terminal 11, it is applied to the next group of transistors which form a peak detector 85, and a signal appears at terminal 8 at the output of this peak detector 85. This signal is passed at terminal 8 to an external capacitor C8 paralleled with resistor R37. This charges the capacitor C8 so it is a peak detector circuit. The voltage of this capacitor C8 is passed through resistor R36 to terminal 5. The next group of transistors form a comparator 86, with the terminal 4 coming from a reference voltage. This is a differential amplifier connected as a comparator comparing the voltages at terminals 5 and 4, and when the voltage on terminal 5 exceeds that on terminal 4, a DC output switching signal appears at terminal 3. This is low at the start when the motor is first energized, and becomes high at the switching speed of about 75% of synchronous speed. The low signal is passed from terminal 3 on a conductor 87. Initially this establishes semiconductor Q11 as off and, hence, makes semiconductor Q12 on, so that terminal 14 is high and, through semicondutor Q9, closes the auxiliary switch 28. At the switching speed, conductor 87 becomes high, which turns on semiconductor Q11, turns off semiconductor Q12 and Q9, and hence opens the auxiliary switch 28.

In the upper left of FIG. 4, a pulse generator circuit 88 generates pulses, e.g., 50 microsecond pulses at a 1 kilohertz rate. These are supplied on a terminal 90 and are applied to the base of semiconductor Q12. These are also supplied to the base of semiconductors Q13 and Q14, which supply drive for the high and low speed switches 71 and 70, respectively. A HI/LO circuit 89 is connected to terminal 2, at which the HI/LO switch 75 is connected.

The motor always starts on the high-speed main and auxiliary windings independent of whether or not the select switch 75 calls for high or low speed. If low speed is selected, the low speed main winding 61 is switched into the circuit by low-speed switch 70, and the high-speed main winding 62 is switched out of the circuit by switch 71, causing the motor to regeneratively brake from the high speed down to the low speed. The high or lwo speed is selected at terminal 2. The speed switch signal line 87 is low at start, and switches to high when the motor reaches switching speed. Terminals 14 and 15 are high, causing the auxiliary winding and high-speed winding switches 28 and 71 to close when the speed switch signal line 87 is low. When the conductor 87 goes high, terminal 14 goes low, causing the auxiliary switch 28 to open but terminal 15 remains high if high speed has been selected at terminal 2. If low speed is selected at terminal 2, terminal 15 goes low and terminal 16 goes high, causing the low-speed winding switch 70 to close.

The speed ratio between high and low speeds is typically 2:1. Some minimum voltage is required across terminals 9 and 10, the voltage sense winding input, to maintain the desired switches in the off condition. In order to achieve this minimum voltage with the wide speed range over which this switch must operate, a sense winding 63 is included in the motor. This winding is spanned for approximately full pitch for the low speed winding, and will be a fractional pitch for the high speed winding. For example, if the speeds are 3600 and 1800 rpm as synchronous speeds of a 60 hertz source, the winding would be spanned for approximately a full pitch, based on four poles, which corresponds to the 1800 rpm synchronous speed, and would be half pitch for two poles, which corresponds to the 3600 rpm speed. This enables the circuit to have sufficient voltage from the voltage sense winding 63 to keep the high speed winding triac and the auxiliary winding triac in the off condition during low speed operation. This is accomplished in a manner similar to that function in FIG. 1. A reference voltage is applied to terminal 4, and in FIG. 5, it will be noted this comes from the voltage divider of R41, R50, and R46, with adjustability for different motor sizes and types at R50. When the peak detector 85 output at terminal 5 exceeds the reference voltage at terminal 4, the comparator 86 has the switching signal output at terminal 3. There is then an immediate positive feedback through R35 to terminal 5, which increases the output at terminal 3 enough to compensate for the lowered signal from the sense winding 63, lowered because the auxiliary winding 26 is now open-circuited. This provides the desired hysteresis to maintain auxiliary switch 28 off. This hysteresis action is sufficient for many motor designs, particularly single-speed motors, to keep the auxiliary winding switched off in spite of the reduced voltage appearing at terminals 9 and 10 when the auxiliary winding is no longer connected to the incoming power. For two-speed motors, operating at low speed, the additional voltage reduction caused by the combined action of switching out the auxiliary winding and lowering the speed may, in some designs, require an auxiliary sense winding as explained above.

A third function performed by this electronic starting circuit 56 is the capability of instantaneous reversing. By this is meant a mode of operation in which the motor is rotating at full speed in one direction, power is removed and then reapplied. However, the power is reapplied with a 180-degree phase shift on either the auxiliary winding or the main winding, and as shown in this embodiment, this is the reversal of the auxiliary winding. This causes the rotating field to instantaneously reverse to travel in the opposite rotational direction, thereby causing motor rotation to also reverse. The electronic starting circuit 56 senses a command for instantaneous reversal, and reconnects the auxiliary winding 26 into the circuit even though the motor speed is too high to demand reconnection of the auxiliary winding. In other words, the speed signal on conductor 87 must be overridden, and this override must endure for a period of time long enough for the motor speed to drop below the auxiliary winding reconnection speed; otherwise, the auxiliary winding will be switched back out immediately and reversal will not occur.

The circuit of FIG. 1 is the simpler circuit for explaining this operation, and shows an instant reversal circuit 91. If switch contacts 92 are momentarily opened, then operating voltage is applied to the base of semiconductor Q5 to immediately turn it on and rapidly discharge capacitor C3 through resistor R30. This is in the peak detector circuit and immediately lowers the voltage to the comparator 51 so that the reference voltage is not exceeded and semiconductor Q2 turns off, semiconductor Q3 turns on, and the auxiliary switch 28 is again closed. Following the reclosure of switch 92, semiconductor Q5 turns off and capacitor C3 must be recharged before the auxiliary winding voltage re-establishes its control of switching the auxiliary switch 28.

In the circuit of FIGS. 4 and 5, a similar operation is performed. At the time of changing from forward to reverse, there is a period of time when the forward switches 64 and 65 are open before reverse switches 66 and 67 close. Concomitantly, there is a period of time when the forward switch 72 opens before the reverse switch 73 closes. This is the momentary opening of the contacts on terminal 7 of FIG. 4, so that the terminal 7 is momentarily not grounded. This turns on semiconductor Q15, which discharges capacitor C8. This causes the speed switch signal line 87 to go low to reclose the auxiliary switch 28, thus energizing the auxiliary winding 26 and permitting the motor to be instantaneously reversed.

In FIG. 5, the two-speed motor circuit is shown. The ganged HI/LO switches 74 and 75 are shown in a high position. If they are changed to the low position, there will be an instant of time when terminal H is not grounded, and also that same instant of time when the terminal K is not grounded. This will again discharge the capacitor C8 to momentarily bring the auxiliary winding 26 into the circuit, but it will immediately be brought back out because the speed is a high speed. If, however, the HI/LO switches 74, 75 are changed from the low to the high speed position, there will again be this momentary instant of time when terminals H and K are not grounded. This will again close the auxiliary switch 28 and bring the auxiliary winding 26 into the circuit, so that the motor may be rapidly accelerated from the low speed to the high speed. For certain types of loads, it is unnecessary to re-energize the auxiliary winding in order to accelerate from low to high speed.

Figure 6:
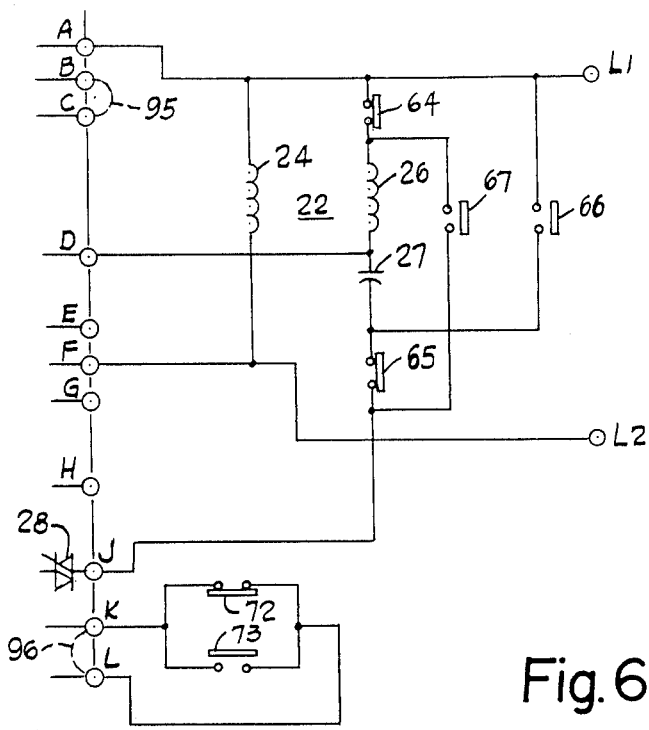
FIG. 6 is a schematic diagram of the connections to a single-speed and instant reversing motor.

FIG. 6 may be substituted for the right half of the circuit of FIG. 5 when only a single speed motor 22 is required. This has the main winding 24 and the auxiliary winding 26, again with the forward and reverse switches 64-67. A jumper 95 is applied between terminals B and C, since the sense winding is not used. A jumper 96 may be applied between terminals K and L if the instantaneous reverse operation is not required.

Figure 7:
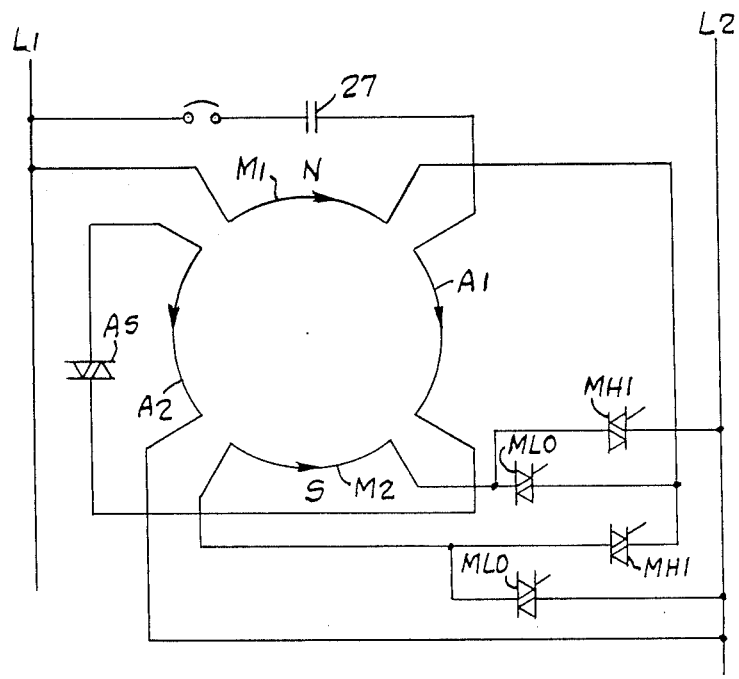
FIG. 7 is a schematic diagram of a two-speed motor with a consequent pole winding.

FIG. 7 shows a main winding M1 and a second main winding M2. This circuit also shows an auxiliary winding A1 and a second auxiliary winding A2. This circuit of FIG. 7 is a diagram for a two-speed motor utilizing a consequent pole arrangement, and shows that it is not necesasry to have a low-speed main winding separate from a high-speed main winding. When the main high switches MHI are closed, current flows from line L1 to line L2 through the main windings M1 and M2, as shown by the arrows. This produces a north pole at the top and a south pole at the bottom, for a two-pole motor. At the same time, the auxiliary switch A would be closed to provide energization through the starting capacitor 27 and the auxiliary windings A1 and A2. Thus, the motor would start and operate as a two-pole motor. If instead of the high speed switches being closed, the main windings M1 and M2 were energized through closure of the main low switches MLO, then main winding M2 is energized so that current passes in a direction opposite to the arrowhead thereon, and hence the lowermost pole is also a north pole, establishing south poles as a consequence of these bucking magnetic fields at the location of the auxiliary windings A1 and A2. Thus, a four-pole consequent winding motor arrangement is produced. This shows that the electronic starting circuit 21 or 56 of the present invention may be used on consequent pole winding motors as well as motors which have two separate main windings for low and high speeds.

Values of components found appropriate for operation of the various embodiments are as listed in Table A:

TABLE A

| Resistors | | Resistors | |
|---|---|---|---|
| R1 | 10K ohms | R31, 32 | 390K |
| R2 | 50 ohms | for one-speed | |
| R3, 4, 5, | 100K ohms | R31, 32 | 15K |
| R6 | 7.2K ohms | for two-speed | |
| R7 | 144K ohms | R33 | 39K |
| R8 | 1K ohm | R34 | 56 ohms |
| R9 | 62 ohms | R35 | 150K |
| R10 | 1K ohm | R36 | 100K |
| R11, 13 | 100K ohms | R37 | 220K |
| R12, 14 | 51K ohms | R38, 39, 40 | 12 ohms |
| R15 | 2.5K ohms | R41 | 1.8K |
| R16 | 47K ohms | R42 | 100 ohms |
| R17 | 200K ohms | R43, 44 | 100 ohms |
| R18 | 4.7K ohms | R45 | 10K |
| R19 | 10K ohms | R46 | 1.8K |
| R20 | 47K ohms | R47 | 10K |
| R21, 23 | 2K ohms | R48 | 1K |
| R22 | 10K ohms | R49 | 10K |
| R24 | 1K ohm | R50 | 500 ohms |
| R25 | 100K | | |
| R26 | 12K | | |
| R27 | 5K | | |
| R28 | 100K ohms | | |
| R29 | 15K | | |
| R30 | 390K | | |
| Capacitors | | Semiconductors | |
| C1 | 220 mf 15 V. | Q1 | T1P47 |
| C2 | .01 mf | Q2 | 2N3904 |
| C3 | 1 mf | Q3 | 2N2222 |
| C4–C7 | .1 mf 50 V. | Q5 | 2N3904 |
| C8 | 4.7 mf | Q7 | 2N4401 |
| C9 | 1000 mf | Q8 | 2N4401 |
| | | Q9 | 2N4401 |
| Diodes | | Q10 | D42T7 |
| | | Q11–Q15 | Part of integrated circuit |
| D1 | MR 818 | | |
| D2 | 1N 9744 15 V. | 28 | 2N6347 |
| D3, 4 | MR818 | 70, 71 | MAC 223A-8 |
| D5 | 1N 4730 3.9 V. | | |
| D6 | MR818 | | |
| D7 | 1N 4740 10 V. | | |
| D8 | MR 818 | | |

TABLE A-continued

| Integrated Circuits | 1N 4006 | | |
|---|---|---|---|
| D11, 12 | 1N 4006 | | |
| D13 | MCR 606-2 | 47, 48, 51, 52 | TL 084 |
| D13 | 1N 4736A | 58 | MOJ 3170 |
| D15 | 1N 4732 | | |

In all circuits, the amplifiers 47 and 84 are part of a scaling circuit to scale down the high sensing voltage to one suitable for semiconductors. This scaling is about 2.5% in FIG. 1, about 0.7% in FIG. 4 for single-speed, and about 18% in FIG. 4 for two-speed, in order to lower the voltage to approximately 5 to 15 volts for utilization in semiconductor circuits.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and the scope of the invention as hereinafter claimed.

What is claimed is:

1. An electronic starting circuit for a single-phase electric motor of any one of single-speed, multi-speed, and instant reversing types, the motor having at least a first main winding and at least one auxiliary winding for starting, said electronic starting circuit comprising, in combination:
   an auxiliary switch adapted to be connected to said motor auxiliary winding to control energization thereto from AC voltage conductors;
   means to obtain a signal increasing as the motor speed accelerates to a switching speed near normal running speed and remaining as a signal of substantial magnitude after opening of said auxiliary switch;
   an amplifier having an input from said signal obtaining means;
   peak detector means connected responsive to the output of said amplifier to determine a peak DC output;
   a reference voltage;
   comparison means to compare the output of said peak detector means with said reference voltage;
   a switching circuit connected to said voltage comparison means and connected to close said auxiliary switch when said peak detected voltage is less than said reference voltage and to open said auxiliary switch and terminate current through said auxiliary winding when said peak detected voltage is greater than said reference voltage; and
   means establishing a positive feedback from output to input of said comparison means to maintain said auxiliary switch open despite lowered voltage from said signal obtaining means.

2. A starting circuit as set forth in claim 1, wherein said amplifier is part of a scaling circuit to scale said switching speed signal to a lower value.

3. A starting circuit as set forth in claim 1, wherein said amplifier is a differential amplifier.

4. A starting circuit as set forth in claim 3, wherein the output of said differential amplifier is a DC output.

5. A starting circuit as set forth in claim 1, including a rectifier connected responsive to the output of said amplifier.

6. A starting circuit as set forth in claim 1, wherein said reference voltage is a unidirectional voltage.

7. A starting circuit as set forth in claim 1, wherein said signal obtained means obtains a signal in accordance with the voltage across the auxiliary winding.

8. A starting circuit as set forth in claim 1, including means to establish hysteresis in the output of said comparison means to maintain said auxiliary switch open despite lowered voltage from said signal obtaining means.

9. A circuit as set forth in claim 1, including:
   a capacitor in said peak detector means connected to be charged to a peak DC output value;
   a transistor connected across said capacitor; and
   a bias circuit connected to bias said transistor into conduction upon reversing of the motor to thus close said auxiliary switch and re-energize said auxiliary winding.

10. An electronic starting circuit for a single-phase electric motor of any one of single speed, multi-speed and instant reversing types, having at least a first main winding and at least one auxiliary winding for starting from AC voltage conductors, said electronic starting circuit comprising, in combination:
    an auxiliary switching adapted to be connected to said motor auxiliary winding to control energization thereto from AC voltage conductors;
    means to obtain a signal increasing as the motor speed accelerates to a switching speed near normal running speed and remaining as a signal of substantial magnitude after opening of said auxiliary switch;
    a reference;
    comparator means to compare said signal with said reference:
    a switching circuit connected to said comparator means and connected to close said auxiliary switch when said signal is less than said reference and to open said auxiliary switch when said signal is greater than said reference;
    means establishing a positive feedback from output to input of said comparator means to maintain said auxiliary switch open despite lowered voltage from said signal obtaining means;
    a high speed switch adapted to control the energization of a high speed main winding arrangement and a low speed switch adapted to control the energization of a low speed main winding arrangement;
    starting means to close said auxiliary winding switch and one of said main winding switches for starting the motor and accelerating it to said switching speed; and
    said switching circuit opening said auxiliary winding switch at said switching speed.

11. A starting circuit as set forth in claim 10, wherein said signal obtaining means obtains a signal proportional to the voltage across said auxiliary winding.

12. A starting circuit as set forth in claim 10, wherein said reference is a DC voltage; and including means to rectify said signal to a DC voltage.

13. A starting circuit as set forth in claim 10, including speed change means to open said one of said main winding switches, and close the other of said main winding switches to change to the other speed.

14. A starting circuit as set forth in claim 10, wherein said starting means closes said auxiliary winding switch and said high speed winding switch to accelerate the motor to said switching speed near high spped.

15. A starting circuit as set forth in claim 14, including speed change means to open said high speed winding switch and close said low speed winding switch to regeneratively brake the motor to a low speed established by said low speed main winding arrangement.

16. An electronic starting circuit for a single-phase electric motor of any one of single speed, multi-speed and instant reversing types, the motor having at least a first main winding and at least one auxiliary winding for starting from AC voltage conductors, said electronic starting circuit comprising, in combination:
an auxiliary switch adapted to be connected to said motor auxiliary winding to control energization thereto from AC voltage conductors:
means to obtain a signal increasing as the motor speed accelerates to a switching speed near normal running speed and remaining as a signal of substantial magnitude after opening of said auxiliary switch;
peak detector means connected to be responsive to said switching speed signal and having an output voltage;
a reference voltage;
comparison means to compare the output voltage of said peak detector means with said reference voltage and to establish a switching voltage output only when the peak detector output voltage exceeds said reference voltage;
a switch circuit connected to said voltage comparison means and connected to close said auxiliary switch upon the absence of said switching voltage and to open said auxiliary switch upon receiving said switching voltage;
means establishing a positive feedback from output to input of said comparison means to maintain said auxiliary switch open despite lowered voltage from said signal obtaining means;
means to rapidly decrease the output of said peak detector means upon reversing of said motor to thus close said auxiliary switch and re-energize said auxiliary winding.

17. A starting circuit as set forth in claim 16, wherein said signal obtaining means obtains a signal proportional to the voltage across said auxiliary winding.

18. A starting circuit as set forth in claim 16, wherein said signal obtaining means includes a sense winding in close association with said auxiliary winding to obtain an induced voltage approximately proportional to motor speed.

19. A starting circuit as set forth in claim 16, including an amplifier connected between said signal obtaining means and said peak detector means.

20. A starting circuit as set forth in claim 16, including means to obtain a DC voltage from said peak detector means.

21. A starting circuit as set forth in claim 16, including a capacitor adapted to be charged to a peak value in said peak detector means, and said rapidly decreasing means including means to discharge said capacitor.

22. A starting circuit as set forth in claim 21, including a transistor connected as said means to discharge said capacitor.

23. A starting circuit as set forth in claim 22, including switch contacts adapted to be momentarily actuated during reversing of said motor to cause conduction of said transistor.

24. A starting circuit as set forth in claim 22, including switch contacts adapted to be momentarily opened during actuation of said reversing means to cause conduction of said transistor.

* * * * *

UNITED STATES PATENT AND TRADEMARK OFFICE
CERTIFICATE OF CORRECTION

PATENT NO. : 4,862,053

DATED : August 29, 1989

INVENTOR(S) : Howard E. Jordan et al.

It is certified that error appears in the above-identified patent and that said Letters Patent is hereby corrected as shown below:

In the Abstract, line 10, "than" should be --then--.

Col. 1, line 27, "not" should be --nor--.

Col. 1, line 31, "motor" should be --more--.

Col. 1, line 67, "axuiliary" should be --auxiliary--.

Col. 3, line 21, "switch" should be --switching--.

Col. 3, line 43, after "voltage" (1st occurrence) insert --,--.

Col. 4, line 68, "±" should be --+--.

Col. 5, line 37, "Tihs" should be --This--.

Col. 6, line 4, "90-20" should be --90-120--.

Col. 7, line 53, "semiconductor" should be --semiconductors--.

Col. 8, line 4, "lwo" should be --low--.

Col. 10, line 3, "necesasry" should be --necessary--.

Col. 10, line 9, "A" should be --AS--.

Col. 11, first two lines of information in TABLE A-continued, delete
"Dategdated    1N 4006
 Circuits
and replace with
--D9, 10      1N 4006      Integrated Circuits--.

Col. 11, line 7, "D13" should be --D14--.

UNITED STATES PATENT AND TRADEMARK OFFICE
CERTIFICATE OF CORRECTION

PATENT NO. : 4,862,053

DATED : August 29, 1989

INVENTOR(S) : Howard E. Jordan et al.

It is certified that error appears in the above-identified patent and that said Letters Patent is hereby corrected as shown below:

Col. 12, line 7, "obtained" should be --obtaining--.

Col. 13, line 30, "switch" should be --switching--.

Col. 14, line 2, after "means;" insert --and--.

Signed and Sealed this

Thirteenth Day of November, 1990

*Attest:*

HARRY F. MANBECK, JR.

*Attesting Officer*     *Commissioner of Patents and Trademarks*